Nov. 29, 1949   J. M. SHOEMAKER   2,489,984
EXPLOSIVE-RELEASE MECHANISM
Filed Feb. 20, 1945

Inventor
JAMES M. SHOEMAKER
By
Attorney

Patented Nov. 29, 1949

2,489,984

UNITED STATES PATENT OFFICE 2,489,984

EXPLOSIVE-RELEASE MECHANISM

James M. Shoemaker, Nichols, Conn., assignor to United Aircraft Corporation, East Hartford, Conn., a corporation of Delaware Application February 20, 1945, Serial No. 578,901

8 Claims. (Cl. 244—1)

This invention relates to a device adapted to be employed for detachably securing to aircraft equipment of the jettisonable type and, in particular, to an explosive-release mechanism which may be utilized for detachably securing to aircraft equipment such as bombs, fuel tanks and the like, to be jettisoned while in flight.

Heretofore, many different types of releasable means have been proposed for detachably securing equipment in place but the inherent difficulty encountered has been that most of them are dependent upon manual means in the nature of a lever, lanyard or handle of one type or another for their operation, whereby the force required to separate the elements may be very great. If such devices are employed on aircraft, it may be quite difficult or even impossible for the pilot, at some critical moment such as will be experienced in a dive or violent maneuver, to cause the jettisoned parts to be separated from the craft since his strength and attention must necessarily be centered upon the various controls.

It is an object of this invention, therefore, to provide a means for rapidly and effectively jettisoning certain components from aircraft at the instant desired while in flight.

A further object of this invention is to provide an explosive-release mechanism having elements therein contained for insuring separation thereof, regardless of the maneuver being accomplished, without requiring the use of excessive manual force.

Another object of this invention is to provide a separable fastening means in which is contained an explosive charge for insuring positive separation of the supporting elements therein contained for jettisoning equipment supported thereby.

These, as well as the various other novel features and advantages of this device will become apparent from a reading of the specification and accompanying drawings, of which:

Figure 1:
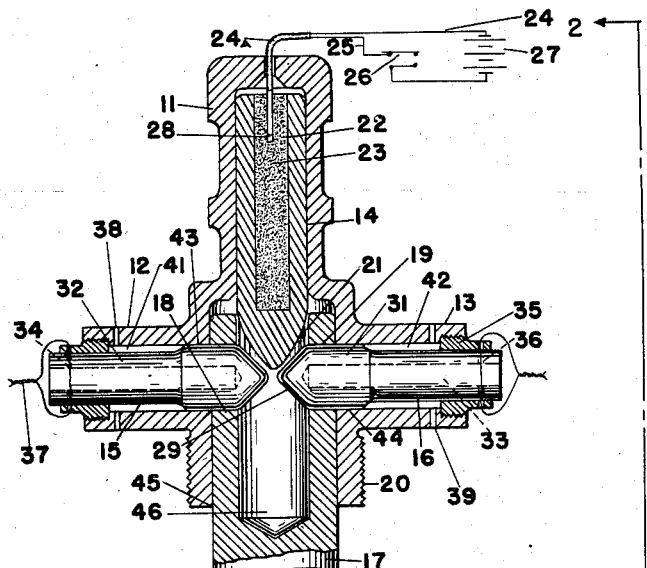
Fig. 1 is a sectional view of the explosive-release mechanism.
Figure 2:
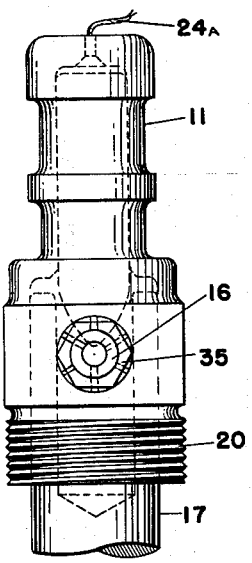
Fig. 2 is a side elevation view taken at 2—2 of the unit shown in Fig. 1.

With reference to the drawings, and, in particular to Figs. 1 and 2, the explosive-release mechanism comprises a housing 11, having outwardly extending arms 12 and 13 within which is contained an explosive propelled element 14 and two locking pins 15 and 16 for supporting a load supporting element such as a hollow ended bolt 17 having apertures 18 and 19 within which locking pins 15 and 16 are adapted to be inserted. The lower portion of the housing 11 is provided with a boss 20 threaded on the outer surface thereof so that the assembled unit may be fastened within a communicating threaded opening on the fuselage of an aircraft or the like. Explosive propelled element 14 has an elliptically shaped nose 21 and is hollowed out for a portion of its length at 22 for receiving an explosive charge 23. A pair of wires 24 and 25, connected through a suitable switch 26 to a source of electrical power such as a battery 27, and, after passing through shield 24a which is sealed within the opening at the top of member 11, are brought into close proximity of one another to form a small gap 28 within the explosive charge. Each of the locking pins 15 and 16 consists of a cylindrical body having a wedge shaped nose 29 terminating at an enlarged cylindrical body portion 31 which extends for a portion of the length of the pin and, finally, a reduced portion 32 extending for the remaining length thereof. Both pins are hollowed out for a portion of their lengths as indicated at 33 in order to reduce the weight thereof. At the outer ends of the pins, small holes 34 are drilled for receiving a safety wire or other securing means. Threadably secured to the outer ends of each of the arms 12 and 13 are hexagonally headed identical bushings 35 which are provided with apertures 36, any diametrically opposed pair of which are to be matched with similar openings of the pins 15 and 16 for receiving safety wire 37 in order to lock the pins in position and to prevent their accidental displacement.

Each of the arms 12 and 13 are provided with side openings 38 and 39, respectively, shown in Fig. 1, as a means for introducing a lubricant to the chambers 41 and 42, formed by the reduced portions of the pins 15 and 16, and also along the length of the pins in contact with the surfaces 43 and 44 of the openings in the arms 12 and 13, in order to prevent freezing of the pins and to insure positive longitudinal movement thereof at the instant desired. These openings 38 and 39 also insure escape of the air, entrapped in chambers 41 and 42, at the time the explosion takes place.

Figure 3:
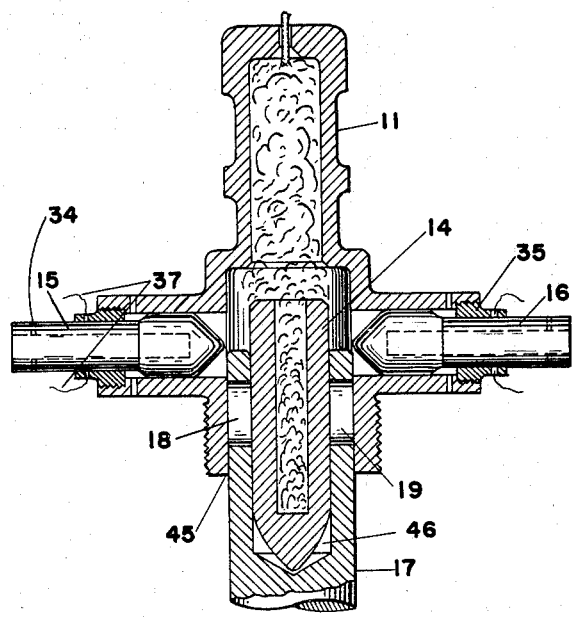
Fig. 3 is a sectional view similar to that shown in Fig. 1 but in which is shown the unit in the exploded condition with partial separation of the various movable expendable parts.

With reference to Fig. 3, the explosive-release mechanism is shown immediately after switch 26 has been closed and the explosive charge fired by reason of the spark created across gap 28. Due to the shape of the communicating ends of the projectile 14 and the pins 15 and 16, the cam action effect created thereby insures longitudinal movement of the pins and shearing of the safety wires 37 when the projectile 14 moves downward due to the explosion. By reason of their inertia, the pins 15 and 16 will move in a longitudinal direction and strike against the inner edges of the bushings 34 and 35 respectively before they come to rest. Thus, having been withdrawn completely from the apertures 18 and 19, they no longer exert any restraint upon the bolt 17. As a result, the bolt 17 is withdrawn from the cylindrical opening 45 of the housing 11 and the load supported thereby is dropped into space. In addition to the weight of the bolt 17 and the load supported thereby, the projectile 14 in striking the bottom of the opening 46 adds its propelling force to that which causes separation of the equipment from the carrying craft.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

I claim:

1. In a mechanism for releasing equipment from aircraft, a housing, means integral with and adapted to secure said housing to said aircraft, diametrically opposed locking pins secured within said housing, safety means for preventing accidental displacement of said locking pins, load supporting means having a plurality of apertures adapted to receive said locking pins and an explosive propelled means contained within said housing adapted to pass between and forcibly eject said locking pins from said apertures of said load carrying means to release said last mentioned means from said aircraft.

2. In a mechanism for releasing equipment from aircraft, a housing provided with two diametrically opposed outwardly projecting arms having longitudinally extending openings therethrough, extending into said housing through an opening provided at the base thereof a load supporting member with a plurality of diametrically opposed apertures therein adapted to come into registration with the openings in said arms, a pair of locking pins extending through the openings in said arms and into said load supporting member, safety means retaining said pins in their normal locking positions, an explosive-charge containing projectile adapted to pass between and to engage with the ends of said locking pins for shifting said pins from their locking to their free positions upon firing of the explosive charge therein contained.

3. In a mechanism for releasing equipment from aircraft, a housing provided with two diametrically opposed outwardly projecting arms having longitudinally extending openings therethrough, extending into said housing through an opening provided at the base thereof a load supporting member with a plurality of diametrically opposed apertures therein adapted to come into registration with the openings in said arms, a pair of locking pins extending through the openings in said arms and into said load supporting member, safety means retaining said pins in their normal positions, an explosive-charge containing projectile adapted to pass between and to engage with the ends of said locking pins for shifting said pins from their locking to their free positions upon firing of the explosive charge therein contained and means for detonating said explosive charge.

4. In a mechanism for releasing equipment from aircraft, a housing provided with two diametrically opposed outwardly projecting arms having longitudinally extending openings therethrough, extending into said housing through an opening provided at the base thereof a load supporting member with a plurality of diametrically opposed apertures therein adapted to come into registration with the openings in said arms, a pair of locking pins extending through the openings in said arms and into said load supporting member, safety means retaining said pins in their normal locking positions, an explosive-charge containing projectile adapted to pass between and to engage with the ends of said locking pins for shifting said pins from their locking to their free positions upon firing of the explosive charge therein contained, and means comprising an electrical circuit adapted to be closed for detonating said explosive charge contained within said projectile.

5. In a mechanism for releasing equipment from aircraft, a housing, means for securing said housing to said aircraft, load-carrying means telescopically received by said housing, a plurality of laterally movable locking means adapted to lock said load-carrying means to said housing, a movable wedge-shaped element within said housing adapted to disengage said locking means and to forcibly eject said load-carrying means from said housing, and means for operably moving said wedge-shaped means to unlock said locking means and to forcibly eject said load-carrying means and said wedge-shaped means from said housing.

6. In a mechanism for releasing equipment from aircraft, a housing secured in said aircraft and provided with a plurality of radial sockets, a load-carrying member extending into said housing through an opening at the base thereof, said load-carrying member being recessed to align with said radial sockets, a locking means laterally movable in each socket to engage the corresponding recess in said load-carrying member, and means for simultaneously retracting said locking means and applying force to said load-carrying member and said locking means to sequentially eject them from said housing.

7. In a mechanism for releasing equipment from aircraft, a housing secured in said aircraft and provided with an opening to receive a load-carrying member, latch means on said load-carrying member, a plurality of opposed openings in said housing each having a movable locking pin therein engageable with said latch means on said load-carrying member, means including an explosive charge for moving said locking pins to unlatch position and sequentially ejecting said load-carrying means from said housing.

8. In a mechanism for releasing equipment from aircraft, the combination of a housing secured in said aircraft substantially adjacent the skin surface thereof, an opening in said housing forming an opening in the skin surface of the aircraft, a load-carrying member extending through said opening into said housing, latch means on said load-carrying member, at least one movable pin slidably mounted in said housing engageable with said latch means, frangible safety retaining means on said pin, an explosive bearing member, operative first to move said pin to the disengage position and second to eject said load-carrying member through said openings and substantially free of said aircraft, a charge of explosive stored in said housing back of said explosive bearing member, and means for igniting said explosive charge to operate said bearing member.

JAMES M. SHOEMAKER.

REFERENCES CITED

The following references are of record in the file of this patent:

UNITED STATES PATENTS

| Number | Name | Date |
| --- | --- | --- |
| 1,618,851 | Thunberg | Feb. 22, 1927 |
| 2,057,699 | Williams | Oct. 20, 1936 |
| 2,069,377 | Matthiessen | Feb. 2, 1937 |

FOREIGN PATENTS

| Number | Country | Date |
| --- | --- | --- |
| 255,240 | Great Britain | July 22, 1926 |
| 496,548 | France | Apr. 7, 1919 |